US009048697B2

(12) United States Patent
Wang et al.

(10) Patent No.: US 9,048,697 B2
(45) Date of Patent: Jun. 2, 2015

(54) INTELLIGENT PROCESS INTERFACE AND SUBSTATION AUTOMATION SYSTEM

(75) Inventors: Zhao Wang, Beijing (CN); Bernhard Deck, Weilheim (DE); Jianping Wang, Vasteras (SE)

(73) Assignee: ABB RESEARCH LTD, Zurich (CH)

( * ) Notice: Subject to any disclaimer, the term of this patent is extended or adjusted under 35 U.S.C. 154(b) by 861 days.

(21) Appl. No.: 13/272,902

(22) Filed: Oct. 13, 2011

(65) Prior Publication Data

US 2012/0089262 A1 Apr. 12, 2012

Related U.S. Application Data

(63) Continuation of application No. PCT/CN2009/000391, filed on Apr. 13, 2009.

(51) Int. Cl.
*G05B 15/00* (2006.01)
*H02H 3/00* (2006.01)
*G01R 31/00* (2006.01)
(Continued)

(52) U.S. Cl.
CPC ............ *H02J 13/0062* (2013.01); *H02H 7/261* (2013.01); *Y02E 60/723* (2013.01); *Y02E 60/724* (2013.01); *Y04S 10/16* (2013.01); *Y04S 10/18* (2013.01); *Y04S 40/124* (2013.01); *Y04S 10/20* (2013.01); *Y02E 60/7838* (2013.01); *Y02E 60/725* (2013.01); *Y04S 10/30* (2013.01); *Y02E 60/74* (2013.01)

(58) Field of Classification Search
CPC ... H02J 13/0062; H02H 7/261; Y04S 40/124; Y04S 10/16; Y04S 10/18; Y02E 60/724; Y02E 60/723

USPC .................... 361/80–83; 700/286; 702/58–64
See application file for complete search history.

(56) References Cited

U.S. PATENT DOCUMENTS 4,689,752 A * 8/1987 Fernandes et al. ............ 700/292
4,709,339 A * 11/1987 Fernandes ..................... 700/293
(Continued)

FOREIGN PATENT DOCUMENTS

CN 2772098 Y 4/2006
CN 101106271 A 1/2008
(Continued)

OTHER PUBLICATIONS

IEEE Standard Communication Delivery Time Performance Requirements for Electric Power Substateion Automation, 2005, IEEEE Power Engineering Society, 24 pages.*
(Continued)

*Primary Examiner* — Sean Shechtman
*Assistant Examiner* — Thomas Stevens
(74) *Attorney, Agent, or Firm* — Buchanan Ingersoll & Rooney PC

(57) ABSTRACT

This specification discloses an intelligent and digitalized process level interface which is referred to herein as an Intelligent Process Interface (IPI). The input of the IPI includes both analog and digital channels and therefore the IPI can be used for substations in transition or retrofit stages with both conventional and non-conventional primary devices. The IPI acts not only as a digitalized interface, but also as an intelligent supervisory and control unit for switching functions. The architecture of the IPI is flexible and allows for the functionality to be distributed to several devices.

14 Claims, 2 Drawing Sheets

(51) Int. Cl.
*H02J 13/00* (2006.01)
*H02H 7/26* (2006.01)

(56) References Cited

U.S. PATENT DOCUMENTS

| | | |
|---|---|---|
| 6,005,759 A * | 12/1999 | Hart et al. ............... 361/66 |
| 6,795,789 B2 * | 9/2004 | Vandiver ............... 702/122 |
| 6,845,301 B2 | 1/2005 | Hamamatsu et al. |
| 7,180,729 B2 | 2/2007 | Lang et al. |
| 2006/0109611 A1 | 5/2006 | Lang et al. |
| 2007/0008670 A1 | 1/2007 | Fletcher et al. |
| 2008/0065270 A1 | 3/2008 | Kasztenny et al. |
| 2009/0240449 A1 * | 9/2009 | Gibala et al. ............... 702/62 |

FOREIGN PATENT DOCUMENTS

| | | |
|---|---|---|
| CN | 101350520 A | 1/2009 |
| EP | 1 850 142 A1 | 10/2007 |
| EP | 1 898 509 A1 | 3/2008 |
| WO | 2009/010084 A1 | 1/2009 |

OTHER PUBLICATIONS

*International Search Report (PCT/ISA/210) issued on Jan. 21, 2010, by China Patent Office as the International Searching Authority for International Application No. PCT/CN2009/000391, 4 pages.
*Written Opinion (PCT/ISA/237) issued on Jan. 21, 2010, by Japanese Patent Office as the International Searching Authority for International Application No. PCT/CN2009/000391, 3 pages.

* cited by examiner

INTELLIGENT PROCESS INTERFACE AND SUBSTATION AUTOMATION SYSTEM

RELATED APPLICATION

This application claims priority as a continuation application under 35 U.S.C. §120 to PCT/CN2009/000391 filed as an International Application on Apr. 13, 2009 designating the U.S., the entire content of which is hereby incorporated by reference in its entirety

FIELD

The present disclosure relates to communication aspects of a Substation Automation system for a high or medium-voltage substation of an electric power transmission or distribution system.

BACKGROUND INFORMATION

Substations in high and medium-voltage power networks include primary devices such as electrical cables, lines, bus bars, switching devices and power transformers, which are generally arranged in switch yards and/or bays. These primary devices are operated in an automated way via a Substation Automation (SA) system. The SA system includes secondary devices, among which Intelligent Electronic Devices (IEDs) are responsible for protection, control and monitoring of the primary devices. The secondary devices may be hierarchically assigned to a station level or a bay level of the SA system. The station level often includes a supervisory computer having an Operator Work Station (OWS) with a Human-Machine Interface (HMI) and running a station-level Supervisory Control And Data Acquisition (SCADA) software, as well as a gateway that communicates the state of the substation to a Network Control Centre (NCC) and receives commands from it. IEDs on the bay level, which are also termed bay units or protection IEDs, are connected to each other as well as to the IEDs on the station level via an inter-bay or station bus primarily serving the purpose of exchanging commands and status information.

A communication standard for communication between the IEDs of a substation has been introduced by the International Electrotechnical Committee (IEC) as part of the standard IEC 61850 entitled "Communication Networks and Systems in Substations". For non-time-critical report messages, section IEC 61850-8-1 specifies the Manufacturing Message Specification (MMS, ISO/IEC 9506) protocol based on a reduced Open Systems Interconnection (OSI) protocol stack built upon the Transmission Control Protocol (TCP) and Internet Protocol (IP) in the transport and network layer, respectively, and upon Ethernet and/or RS-232C as physical media. For time-critical event-based messages, such as trip commands, section IEC 61850-8-1 specifies the Generic Object Oriented Substation Events (GOOSE) directly on the Ethernet link layer of the communication stack. For very fast periodically changing signals at the process level such as measured analog voltages or currents, section IEC 61850-9-2 specifies the Sampled Values (SV) protocol which also builds directly on the Ethernet link layer. Hence, part 9 of the standard defines a format to publish, as multicast messages on an industrial Ethernet, digitized measurement data from current or voltage sensors on the process level as a substitute to traditional copper wiring.

Hence, an IED controls actuators of assigned primary devices on the basis of signals from assigned sensors for switch or transformer tap changer position, temperature, voltage, current, etc. signals from other IEDs, and signals from the supervisory system. Conversely, an IED communicates a state or behavior of its assigned primary devices (e.g., selected sensor readings) to other IEDs or to the supervisory system. The signals can be transmitted as network messages, for instance according to IEC 61850-8-1 or IEC 61850-9-2 messages as introduced above.

Secondary devices on a process-level of the SA system include conventional Instrument Transformers (ITs) for voltage (Voltage Transformers (VT)) and current (Current Transformers (CT)) measurement, gas density or pressure sensors, as well as contact probes for sensing switch and transformer tap changer positions. Furthermore, exemplary intelligent sensors such as non-conventional electronic or optical sensors for current or voltage include an Analog to Digital (A/D) converter for sampling of analog signals, and are connected to the bay units via a dedicated bus as part of an intelligent process interface. The latter replaces the conventional hard-wired process interface that connects conventional ITs in the switchyard, via dedicated copper wires and junction boards, to different bay units which individually sample the analog signals from the ITs.

Additional secondary devices, so-called "protection relay devices" or "conventional IEDs", are connected to the ITs as well as to switching devices like Circuit Breakers or Disconnectors, via dedicated cables or wires, for monitoring status and/or position of the switching devices and for issuing commands to close or open the switching devices based on decisions from corresponding protection functions and control functions. It is known to use interposing or intermediate relays arranged between these devices and an actuator or tripping/control circuit of a switching device to isolate the secondary from the primary devices. The interposing relay may also fulfill local or remote controlled blocking functions, an anti-pumping function, a trip circuit supervision function and a compressor pressure low function. The interposing relay can be integrated into the protection relay device or the conventional IED, or can be distributed fixed on the front or rear of a cubicle including the secondary devices.

For the purpose of synchronization with other internal data, sampling of analog signals by an A/D converter of a process interface (in, for example, electronic or non-conventional current and voltage sensors having a digital output, merging units, and bay units) requires correct time stamping. In other words, the devices that sample analog values and send the digitized messages to the network are synchronized to each other through a common source. This is today accomplished typically through a pulse-per-second signal coming from a GPS receiver, or through Ethernet-based protocols such as IEEE1588 guaranteeing accuracy levels which are suitable for those types of applications.

IEC 61850 defines several profiles for 9-2, a so-called full profile and a light edition (9-2LE). Common to both profiles is the main characteristics on how sampling data is encoded, time stamped and transmitted over an Ethernet-based network. The sending frequency is dependent on the electrical network line frequency or period (50 Hz or 60 Hz) itself. Data sampled 80 times per period is sent off the SA communication network in messages or packets at a rate of 4 kHz or 4.8 kHz for protection and control purposes, while 256 samples/period for revenue metering and power quality monitoring applications result in a rate of 12.8 kHz or 15.36 kHz, respectively.

Depending on their respective design, different conventional ITs for current and voltage have different characteristics, for example, with respect to accuracy, phase error, transient behavior, frequency response and saturation.

Furthermore, non-conventional sensors including, for example, voltage transducers based on the electro-optic effect (Pockels effect) in a crystal and current transducers using a Rogowski coil or the magneto-optic effect (Faraday effect) in bulk glass or in an optical fiber likewise entail different characteristics. Different IT types are designated TPS, TPX, TPY, and TPZ, while the transformer type TPE has been introduced to designate electronic transformers.

U.S. Pat. No. 6,845,301 discloses a so-called Merging Unit (MU) as part of an intelligent process interface. The MU may be connected, via dedicated copper wires or via a dedicated serial bus, to a plurality of sensors. The MU is configured to process different signals indicative of current or voltage in a substation of an electric power system, by time-synchronizing the signals and by generating and transmitting, over a substation communication network a network message including sampled values of the signals.

EP 1898509 discloses a protection and control system for electric power networks with signal and command (process) interfaces termed "bricks" and located at the primary equipment. Each brick converts analog input signals into digital representations and can execute commands generated by a protection and control IED. Each brick is independently connected via dedicated point-to-point optical links to a plurality of IEDs, thereby explicitly excluding the use of Ethernet switches to share data among IEDs.

U.S. Pat. No. 7,180,729 discloses an arrangement for controlling and monitoring a switching installation in which a station control computer is configured to perform protection and control functions. Furthermore, the arrangement includes switch control devices which are used to digitally control switches of the switching installation and which include digital inputs and outputs. The arrangement also includes a separate electronic conversion system provided with digital outputs. The digital inputs and outputs of the switch control devices and the digital outputs of the electronic conversation system are logically connected to the station control computer by means of a communication connection or bus.

SUMMARY

An exemplary embodiment of the present disclosure provides an Intelligent Process Interface (IPI) of a Substation Automation (SA) system for a substation of an electric power system. The exemplary IPI includes a processing module configured to issue a command signal for operating a switching device of the substation, and to generate and transmit, over a communication network of the SA system, a network message including sampled values of a first signal and a second signal, where the signals are measured by at least one of an Instrument Transformer (IT) and a sensor connected to the IPI via an input interface. The processing module is also configured to generate the command signal based on the first signal.

An exemplary embodiment of the present disclosure provides a Substation Automation (SA) system for a high or medium voltage substation of an electric power system. The exemplary SA system includes an Intelligent Electronic Device (IED) configured to perform at least on one of protection, control and monitoring functions based on signals being indicative of a process quantity of the substation and originating from at least one of an Instrument Transformer (IT) and a sensor arranged in the substation. The exemplary SA system also includes a SA communication network, and an Intelligent Process Interface (IPI) connected to the at least one of the IT and sensor via an input interface and connected to a switching device for transmitting a command signal. The IPI is configured to generate the command signal based on a signal received from the at least one of the IT and sensor.

BRIEF DESCRIPTION OF THE DRAWINGS

Additional refinements, advantages and features of the present disclosure are described in more detail below with reference to exemplary embodiments illustrated in the drawings, in which.

The reference symbols used in the drawings, and their meanings, are listed in summary form in the list of designations. In principle, identical parts are provided with the same reference symbols throughout the drawings.

DETAILED DESCRIPTION

Figure 1:
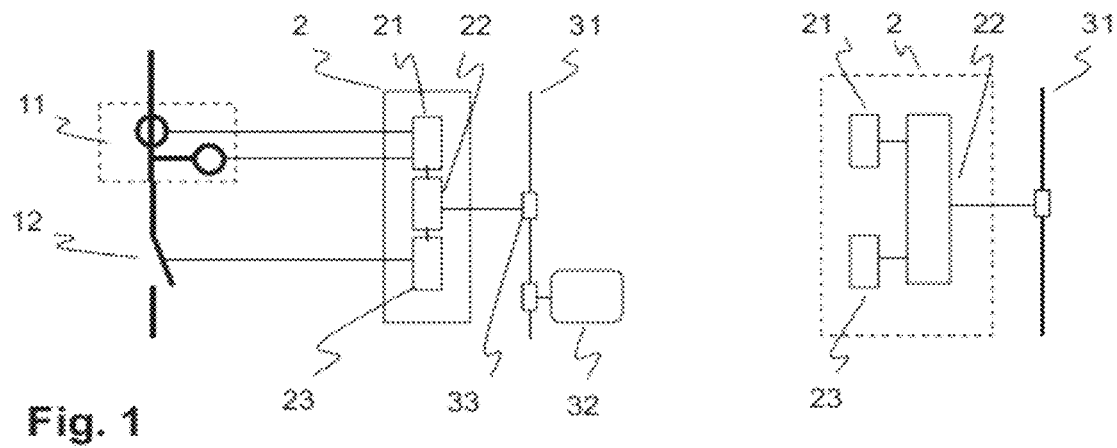
FIG. 1 shows exemplary components of a substation including two variants of an Intelligent Process Interface according to an exemplary embodiment of the present disclosure.

Exemplary embodiments of the present disclosure advantageously reduce a communication or network load of a communication network of a Substation Automation (SA) system for a high or medium voltage substation of an electric power system. Exemplary embodiments of the present disclosure provide an Intelligent Process Interface (IPI) of a SA system for a substation of an electric power system, as well as a SA system for a high or medium voltage substation of an electric power system, where the SA system includes such an IPI, which achieve the above-described features.

An exemplary embodiment of the present disclosure provides an Intelligent Process Interface (IPI) which combines the functionality of a Merging Unit (MU) and of an Intelligent Switching device Interface (ISI) and which is configured to be connected via a single communication module to a SA communication network operating according to the IEC 61850 standard. The IPI is configured to transmit network messages including merged sampled values of a first signal and a second signal indicative of process quantities, such as current and voltage at a particular substation location, measured by Instrument Transformers (ITs) or sensors that in turn are connected to the IPI via analog or digital input interfaces, respectively. The IPI is also configured to exchange network messages including switching device status information and/or commands with an Intelligent Electronic Device (IED) likewise connected to the SA communication network. In addition, the IPI is configured to issue a command signal to the switching device or another piece of primary equipment, based on a network message received over the communication network or based on the signals measured by the ITs or sensors and received via the input interface. In the latter case, the fact that some intelligence at the IPI may directly evaluate the input signals from the connected ITs or sensors reduces the number of network messages that would otherwise have to be exchanged over the SA communication network between the MU, the IED, and the Switching device Interface.

In accordance with an exemplary embodiment, the IPI is configured to process both analog signals from conventional instrument transformers hard-wired to the IPI as well as digital signals from non-conventional sensors connected to the IPI via a serial bus. Likewise, the IPI is configured to generate binary command signals on behalf of conventional switching devices wired to the IPI, and/or to generate and transmit command messages over a process level communication link to a switching device that itself has a digital interface.

In accordance with an exemplary embodiment, the IPI is configured to synchronize the first and second signals by generating and/or aligning sampled values from the two signals with a common timestamp. This may include digitally processing sampled values of a signal as received from a sensor and/or as generated by the IPI from an analog signal. Synchronizing the two signals before merging them into a single network message further reduces network traffic and ultimately facilitates a configuration of the protection and control functions on the protection and control IEDs that receive and evaluate the network messages.

In accordance with an exemplary embodiment, the IPI is configured to execute a number of intelligent and/or advanced functions in relation to the switching device that is responsive to the command signal issued by the IPI. These functions including one or more of interlock functions, circuit breaker tripping and switches on/off control functions, a synchronization-check function, disturbance recording, on-line switch health or condition supervision, optional protection and control functions such as pole discordance protection, auto-reclosing, breaker failure protection functions, time delayed over-current protection, and time delayed under-voltage protection.

In accordance with an exemplary embodiment, the IPI integrates some blocking or interlocking logic on behalf of the assigned switching device. Concentrating the logic in one device facilitates engineering and maintenance as compared to a distributed case where strict coordination of blocking functions between switchgear and interposing relays is required. Correspondingly, a use of the latter can be avoided altogether.

In accordance with an exemplary embodiment, the IPI is configured to prepare, by D/A conversion from a digital signal received from a sensor, and send analog signals to a conventional protection relay or IED that executes functions based on this analog signal.

An Intelligent Process Interface (IPI) as set forth in the present disclosure is hierarchically situated on a process-level in-between protection/control Intelligent Electronic Devices (IEDs) and primary devices of an electric power substation. The IPI includes a Merging Unit (MU) and an Intelligent Switch Interface (ISI), the main properties of which will be individually described further below.

FIG. 1 depicts conventional Instrument Transformers (ITs) 11 arranged in proximity to an exemplary switching device 12 of the substation, as well as two basic architectures of the IPI 2 according to an exemplary embodiment of the present disclosure. On the left hand side of FIG. 1, the IPI is depicted as a single device with three main modules 21, 22, 23 included in the same housing. The IPI depicted on the right hand side of FIG. 1 includes three individual devices each respectively including one of the aforementioned modules. Among the modules, an A/D module 21 converts the analog input signals from conventional ITs 11 hard-wired to the A/D module 21 into digital signals in line with the IEC61850-9-2 format. An I/O module 23 receives primary status information from switching device 12 of the substation connected to the I/O module 23 via cables, and converts the received primary status information to digital signals in accordance with the IEC 61850-9-2 format. The I/O module 23 also sends binary open/close commands to an actuator of the switching device, based on, for example, instructions from a higher level bay unit or IED 32 executing control functions.

A single communication module 22 communicates, via a suitable backplane bus, to the A/D converter module 21 and the I/O module 23 on the one hand, as well as to the protection/control IED 32 connected to the substation communication network or process bus 31 on the other hand. The communication module 22 can also interface directly to digital input signals from intelligent sensors, which signals are transmitted via a process level bus according to the IEC 61850-9-2 format or any other suitable protocol. The communication module 22 merges these digital input signals with the digital signals obtained by conversion in the A/D module 21 before sending them to the process bus in accordance with the IEC 61850-9-2 format. The communication module 22 includes a Network Interface Card (NIC) that in turn is connected to Ethernet switch 33 as a node of the communication network. If the communication network is deployed redundantly, some of the components of the NIC as well as a leaf link to redundant Ethernet switches may be doubled.

The basic functionality of a Merging Unit (MU) is to merge the current and/or voltage measurement outputs of the ITs and sensors that are connected to the MU, and generate network messages based thereupon. Accordingly, in the exemplary embodiment depicted on the right hand side of FIG. 1, the communication module 22 can itself be considered a "simplified MU", which merges and optionally synchronizes exclusively digital signals. In order to save wires and cables, the aforementioned modules of the IPI are arranged on a process level of the SA system in close proximity to the switching device, for example, at a distance of 2 to 10 meters (which is considerably less than the conventional distance of a few hundred meters between the switchgear and the control room), and are provided with suitable environment (temperature) and EMC withstanding capabilities.

In accordance with an exemplary embodiment, the communication module 22 of the ISI is a processing module configured to perform the operative functions described herein. In accordance with an exemplary embodiment, the communications module 22 may include a processor (e.g., a general purpose processor or an application specific processor) configured to execute a computer program tangibly recorded on a non-transitory computer-readable recording medium (e.g., a non-volatile memory such as a ROM, hard disk drive, optical memory, etc.) included in the ISI 2.

Figure 2:
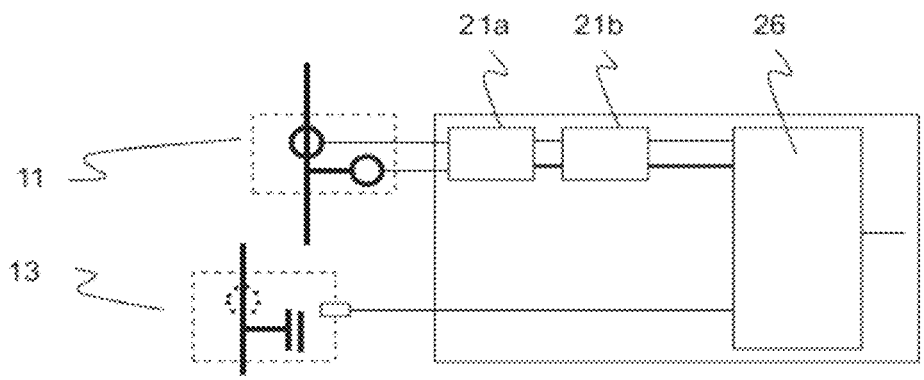
FIG. 2 depicts components of a Merging Unit according to an exemplary embodiment of the present disclosure.

FIG. 2 depicts some of the components of an exemplary "extended MU" that is particularly advantageous in a retrofit situation, for example, for use in a substation where some of the originally present conventional ITs have been replaced by electronic sensors. To that purpose, the MU includes an analog input interface with clamps for receiving analog signals from hard-wired conventional ITs 11, and a digital input interface with ports for receiving digital signals from intelligent electronic sensors 13. In practice, and depending, for example, on the specific bay architecture, signals from up to twenty ITs/sensors may be accommodated by the input interfaces. The analog signals are treated by an anti-aliasing filter 21a and subsequently converted into a digital signal by A/D converter 21b. The digital signals from the sensors 13 are transmitted via a dedicated serial bus or local process bus to the digital input interface of the MU. Merging and synchronization of the various digital signals is performed by a digital synchronization filter 26. The latter, together with appropriate communication facilities, can likewise be considered a "simplified MU" with both synchronization and communication function.

The digital synchronization filter 26 can synchronize the signals from a plurality of input channels including, for example, signals from both conventional ITs and non-conventional sensors. In other words, the synchronization filter digitally processes sampled values of the signals as received from a sensor and/or as generated by the A/D converter 21b from the analog signal. Synchronization of the signals includes a compensation of a total time delay that a signal incurs between its creation at the IT/sensor and its data processing by the synchronization filter. The total delay includes an IT/sensor inherent delay and a channel data processing delay.

An exemplary compensation considers a total delay time TD to be the sum of a first part TS representing a time delay introduced by the IT/sensor, and a second part TM representing the signal processing time delay introduced by the MU itself. Depending on the type of IT/sensor, the delay TS may vary between 28 μs (0.5°) and 168 μs (3.036°), for example. An initial value of the delay TS is provided by the standard IEC 60044-6 for different types of ITs; however repeated measurements during normal load operation ensure that the correct delay times TS, TM are actually configured into the MU.

Figure 3:
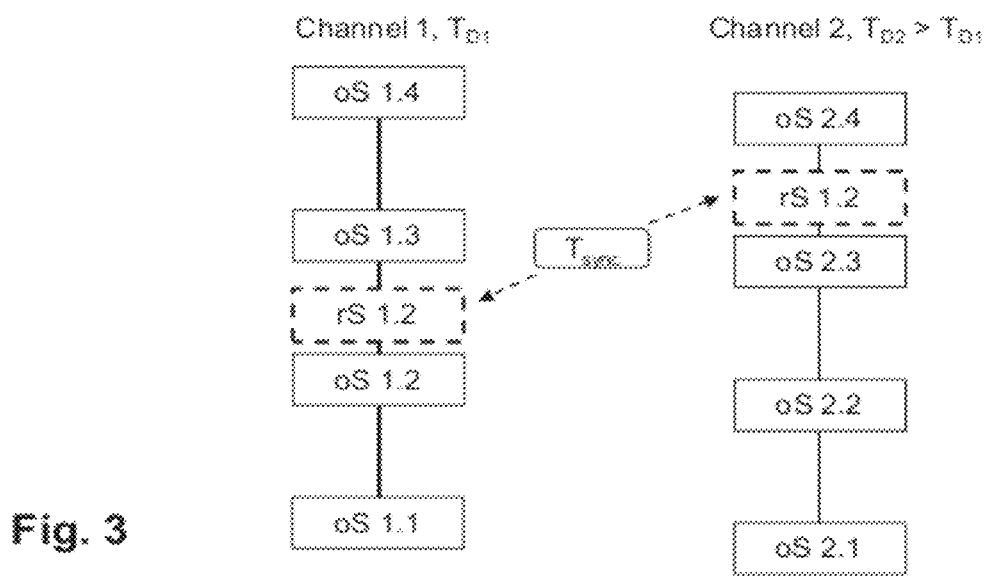
FIG. 3 is a succession of unsynchronized samples from two channels according to an exemplary embodiment of the present disclosure.

FIG. 3 depicts, on a time axis progressing in a vertical direction, successive samples, i.e. digitally sampled values of a current or voltage signal, as originally received by the MU. The samples originate from two different ITs/sensors and are denoted oS 1.x and oS 2.x, respectively. The synchronization of the two channels can include the following steps:

a) determining, for both channels, a total time delay TD1, TD2;

b) receiving, in view of the subsequent operations, a minimum number of samples required by the synchronization filter; and c) generating new samples rS 1.y, rS 2.y by re-sampling and time tagging, which includes decimation and interpolation of the received samples in order to calculate the new samples corresponding to sampled values of the current or voltage signal at a moment or instant Tsync in-between the received samples.

The latter moment is converted to a real or true time tag to be appended to the new samples, for example, by d) merging all synchronized samples with the same real time tag Tsync into one network message.

An Intelligent Switch Interface (ISI) is a logical switch node according to IEC 61850, through which protection IEDs and/or bay units can access a switching device in the substation, for example, via GOOSE messages that make the ISI issue binary open/close commands on behalf of a switching device. The ISI may have both binary input/output means (e.g., an interface) for interfacing conventional switches via cables, as well as a digital port for interfacing those primary devices which have digital interface for process level communication. IEC 62271-3 is a standard for high-voltage switchgear and control gear that specifies equipment for the digital process level communication replacing the conventional metal parallel wiring.

The ISI may implement, in a flexible manner, a number of intelligent functions, including interlock function, measurement functions, disturbance recorder, on-line switch health or condition supervisory, multi-type operate, communication with modern substation automation systems in higher levels, optional protection and control functions. ISI may further implement synchrocheck function, pole discordance protection, auto-reclosing, breaker failure protection functions, time delayed over-current protection, time delayed under-voltage protection functions.

The IPI can be used for conversion between conventional devices and non-conventional devices like a gateway. With the ISI of the present disclosure, Bay Units with digital interface can access conventional switch(es), and Bay Units without a digital interface can also access a switch with a digital interface.

The Intelligent Process Interface (IPI) can not only convert the conventional primary devices output to digital format, but also convert the non-conventional primary devices output to analog format. To that purpose, the IPI also includes a digital-to-analog (D/A) converter and an analog output interface to a cable- or wire-based communication link. In other words, conventional IEDs or Bay Units without a digital interface can directly access conventional ITs, and access non-conventional sensors through the IPI. Bay Units with a digital interface can directly access non-conventional Primary Devices, and access conventional Primary Devices through the IPI.

Figure 4:
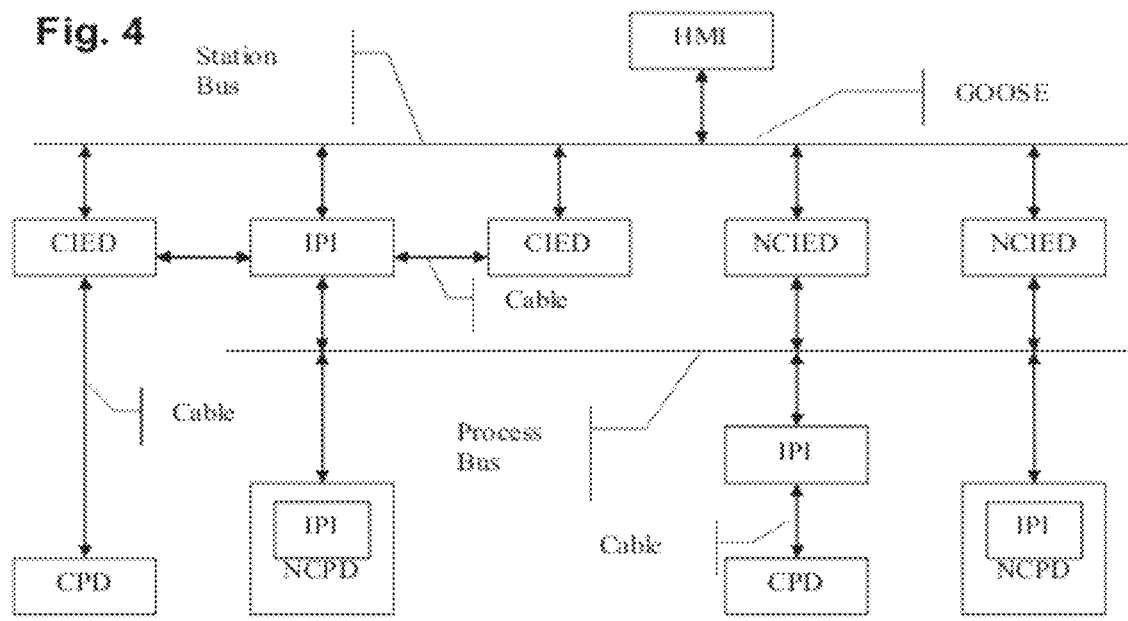
FIG. 4 shows a Substation Automation system with a plurality of use cases of the Intelligent Process Interface according to an exemplary embodiment of the present disclosure.

In FIG. 4, the Bay Units with digital port (NCIED) can interface primary devices with a digital port (NCPD) via a Process Bus. A primary device without a digital port (CPD) can only interface Bay Units via cables, and hence requires the IPI to connect to the NCIED. On the other hand, Bay Units without a digital port (CIED) can only interface primary devices via cables, and hence require the IPI to connect, via a Process Bus, to primary devices with a digital port (NCPD). Finally, primary devices without a digital port (CPD) can be updated to NCPD by integrating the IPI.

Figure 5:
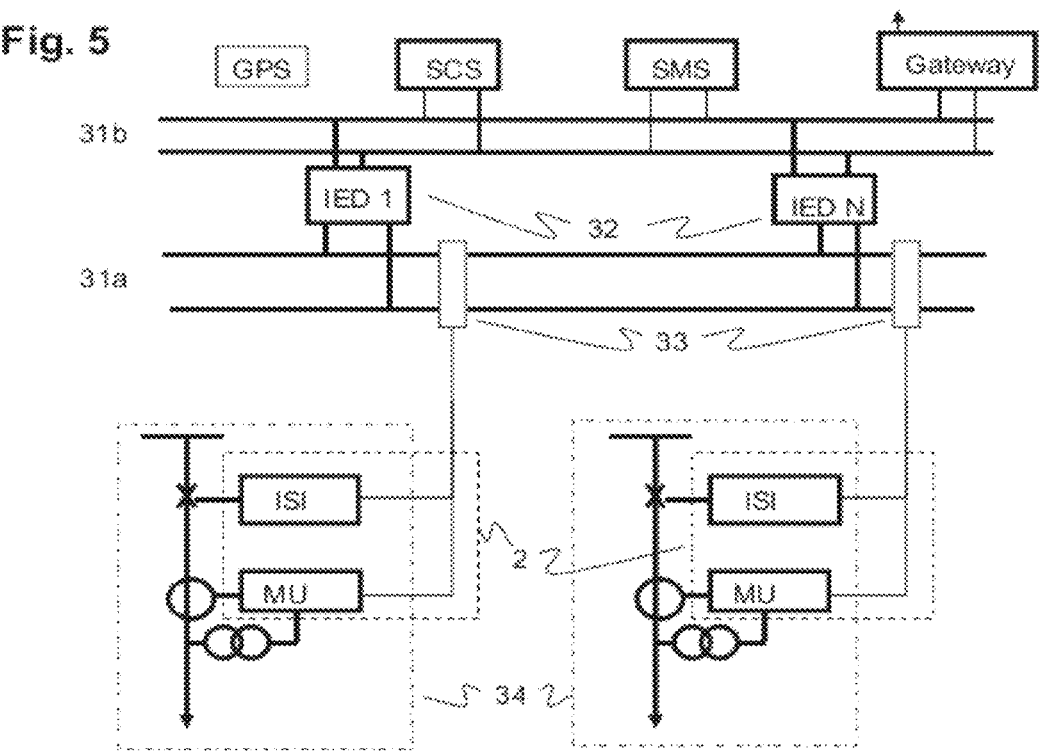
FIG. 5 shows two bays of a substation together with components of a Substation Automation system including redundant communication networks according to an exemplary embodiment of the present disclosure.

FIG. 5 depicts two bays 34 of a substation and an excerpt of a digital SA system including a plurality of IPIs and IEDs implementing, for example, in a redundant arrangement, protection and control as well as optional monitoring functionality. The IEDs 32 receive data from the IPI 2 and send decisions such as trip commands or control commands to the IPI 2 via redundant process bus 31a and Ethernet switches 33. The Station Control System (SCS) and Station Monitoring System (SMS) will communicate with IEDs via a redundant inter-bay or station bus 31b. The total system is synchronized with a GPS clock and connected to a Network Control Centre via a gateway.

In summary, exemplary embodiments of the present disclosure provide for the measurement of currents and voltages in high or medium voltage substations with conventional Instrument Transformers (IT) and non-conventional electronic and optical sensors, and further provide the processing of the transformer outputs for substation protection against faults. Exemplary embodiments of the present disclosure also provide for the monitoring and control of switching devices in high voltage substations, including on-line health or condition monitoring and control of switching devices in conventional or digital way. To this end, an intelligent and digitalized process level interface (herein termed Intelligent Process Interface IPI) is introduced.

This IPI is an interface connection between protection/control IEDs and primary devices, for example, in the following cases:

1) Connection between IEDs with digital interface and conventional primary devices (instrument transformers such as CT/VTs, switches, circuit breakers)

2) Connection between conventional IED and primary devices with digital interface 3) IPI acts as a virtual or logical primary device, through which IEDs could monitor/supervise or control real primary devices 4) IPI interfaces different ITs with different features, and converts all incoming channels into digitalized and synchronized signals with the same synchronized time-stamp It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

11 Instrument Transformer (IT)
12 switching device
13 electronic sensor
2 Intelligent Process Interface (IPI)
21 A/D module
21a anti-aliasing filter
21b A/D converter
22 communication module
23 I/O module
31 substation communication network
31a process bus
31b station bus
32 Intelligent Electronic Device IED
33 switch
34 substation bay

What is claimed is:

1. An Intelligent Process Interface (IPI) of a Substation Automation (SA) system for a substation of an electric power system, the IPI comprising:
 a processing module configured to issue a command signal for operating a switching device of the substation, and to generate and transmit, over a communication network of the SA system, a network message comprising sampled values of a first signal and a second signal, the signals being measured by at least one of an Instrument Transformer (IT) and a sensor connected to the IPI via an input interface, said sampled values being generated and transmitted by the IPI;
 wherein the processing module is configured to generate the command signal based on the first signal;
 wherein a merging unit comprises current and/or voltage measurement outputs and sensors connected to said merging unit;
 wherein said IT and said sensor include a compensation of a total time delay by using a digitally processed synchronization filter;
 wherein said total time delay includes the sensor delay and the channel data processing delay; and
 wherein said sampled values are synchronized by using two channels in which new samples are formed.

2. The IPI according to claim 1, wherein the processing module is configured to merge the first and second signals received from at least one of a conventional current or voltage transformer and a non-conventional current or voltage sensor.

3. The IPI according to claim 1, wherein the processing module is configured to synchronize the first and second signals before generating the network message.

4. The IPI according to claim 1, wherein the processing module is configured to generate the command signal by executing an intelligent function based on at least one of the first signal and a network message.

5. The IPI according to claim 1, wherein the processing module is configured to integrate blocking logic on behalf of the switching device.

6. The IPI according to claim 1, wherein it is adapted to transmit analog signals to a conventional protection relay (CIED).

7. The IPI according to claim 1, wherein the processing module is configured to merge the first and second signals received from at least one of a conventional current or voltage transformer and a non-conventional current or voltage sensor, and to issue a binary command comprising the command signal.

8. The IPI according to claim 7, wherein the processing module is configured to synchronize the first and second signals before generating the network message.

9. The IPI according to claim 1, wherein the processing module is configured to merge the first and second signals received from at least one of a conventional current or voltage transformer and a non-conventional current or voltage sensor, and to generate a command message comprising the command signal.

10. The IPI according to claim 9, wherein the processing module is configured to synchronize the first and second signals before generating the network message.

11. A Substation Automation (SA) system for a high or medium voltage substation of an electric power system, the SA system comprising:
 an Intelligent Electronic Device (IED) configured to perform at least one of protection, control and monitoring functions based on signals being indicative of a process quantity of a substation and originating from at least one of an Instrument Transformer (IT) and a sensor arranged in the substation;
 a SA communication network; and
 an Intelligent Process Interface (IPI) connected to the IT and sensor via an input interface and connected to a switching device for transmitting a command signal,
 wherein the IPI is configured to generate the command signal based on a signal received from at least one of the IT and sensor,
 wherein the IPI is configured to generate and transmit, over the SA communication network, a network message comprising sampled values of a first signal and a second signal, the signals being measured, respectively, by the IT and the sensor, and
 wherein the IPI further comprises a digital synchronization filter for synchronizing the first and second signals by compensating a total time delay, the total time delay including a channel data processing delay and a delay inherent to, respectively, the IT and sensor.

12. The SA system according to claim 11, wherein the IPI is configured to generate and transmit, over the communication network of the SA system, a network message comprising sampled values of a first signal and a second signal, the signals being measured by the at least one of the IT and sensor connected to the IPI via the input interface.

13. The SA system according to claim 12, wherein the IPI comprises an analog input interface configured to be connected to an IT, and a digital input interface configured to be connected to a sensor arranged in the substation via a digital link, and
 wherein the SA system comprises:
 an Instrument Transformer (IT) hard-wired to the analog input interface of the IPI; and
 a sensor arranged in the substation and connected to the digital input interface of the IPI via the digital link.

14. The SA system according to claim 11, wherein the IPI is arranged at a distance of approximately 2 to 10 meters from the switching device.

\* \* \* \* \*